United States Patent Office 3,406,398
Patented Oct. 15, 1968

3,406,398
MULTIMODE PRIMARY FEED FOR MONOPULSE RADAR
Daniel Edmond Beguin, Saint Prix, France, assignor to International Standard Electric Corporation
Filed Aug. 1, 1966, Ser. No. 569,415
9 Claims. (Cl. 343—16)

ABSTRACT OF THE DISCLOSURE

The metallic sides of a truncated pyramidal horn-type radar antenna are arranged so that the aperture is variable in both vertical and horizontal dimensions by pivotal displacement of opposed pairs of sides toward and away from one another while maintaining adjacent sides in direct physical connection over substantially their entire lengths.

---

The present invention concerns a multimode aerial for single monopulse radar and more particularly an aerial which comprises a horn with a variable aperture enabling the width of the illuminated angular zone to be progressively varied.

In a monopulse radar, it may be required, either in acquisition or in a tracking mode operation, to vary progressively the width of the radiation pattern.

With this radar one can carry out simultaneously the tracking of a moving target or main target and a distance measurement in azimuth and elevation between this main target and a secondary target constituted, for instance, by the ground explosion of a shell. It has three operation modes, viz. the mode 1 for surveillance and acquisition, the mode 2 for the tracking and rough distance measurement, and the mode 3 for the tracking and fine distance measurement. In mode 2, the width of the tracking gate and the angular width of the covered zone are approximately three times wider than in mode 3 so that this last mode enables to carry out a distance measurement of high accuracy.

In a monopulse radar, the aerial is constituted generally by a focalizing system (lens or reflector) located in front of a primary source materialized by a rectangular section horn. In a classical monopulse aerial this horn, the larger dimension (reference a) which is horizontal, comprises a vertical intermediate wall and the two outputs are connected to a hybrid junction delivering signals equal respectively to the sum and to the difference of the energies collected on the two apertures.

It is known that with such a primary source, it is not possible to achieve the simultaneous "optimization" of the gains in the sum and difference channels.

The operation modes 2 and 3 defined hereabove can be obtained by using two pairs of beams having angular width in the ratio 3, which are elaborated by multiple primary sources switched in accordance with the required mode of operation. Such systems present, nevertheless, the inconvenience that the gain is low and that they require an electronic switching system, the setting into operation of which is delicate.

Another system consists in modifying the width $a$ of the horn aperture. In effect, it is known that the half-power angular width of the main lobe of the energy radiated by an aperture is nearly inversely proportional to the width of this aperture.

It is thus possible to modify the radiation pattern of the aerial by obturating progressively the two apertures of a classical monopulse horn, but this simple method cannot be used practically because it leads to difficulties of adaptation of the horn when the aperture varies.

It is also possible to carry out this modification by providing movable lateral plates for the horns and by varying simultaneously their distance with respect to the intermediate wall. But, since the horn is of pyramidal form, the electrical contact between these four plates would be obtained only for one single value of the aperture, the intermediate wall remaining fixed. This problem may be solved by the provision of biasing means between the intermediate plates.

It is also possible to use, as primary source for a monopulse aerial, a horn without any walls, which constitutes a multimode source, as mentioned in the two articles entitled, "Optimum Feeds for All Three Modes of a Monopulse Antenna," published in the September 1961 issue of the Review "IRE Transactions on Antennas and Propagation" (pages 444 to 453 and 454 to 460).

Such a multimode source uses the property according to which several fundamental modes and their harmonics may propagate simultaneously in a waveguide up to a maximum order determined by the cutoff frequency of the guide. By combining several propagation modes in one same guide, it is possible thus to elaborate, in the aperture of the horn, the required illumination laws for the sum and difference channels, the two laws being perfectly independent one from the other. It is then shown that the optimization condition defined hereabove is closely reached if the fundamental even mode $H_{10}$ is used for the sum channel and the fundamental odd mode $H_{20}$ for the difference channel.

In the present invention, an aerial is achieved enabling to obtain a progressive variation of the illuminated angular zone, by making provision of moving lateral plates for a multimode primary source. In such a horn, the presence of a moving wall is not a hindrance, and a good electrical contact can be obtained for all the dimensions of the aperture.

The object of the present invention is thus to achieve a multimode horn enabling to obtain a radiation pattern with variable width in azimuth (or in elevation).

The present invention will be particularly described with reference to the accompanying drawings in which:

FIGURE 1 represents a classical pyramidal horn for monopulse aerial in which the aperture and the throat are referenced respectively ABCD and A'B'C'D' and the free end of the wall is referenced MN.

1 designates the length of this horn, $2a$ designates its aperture in the horizontal direction and $h$ its aperture in the vertical direction.

If the lateral walls AA'C'C and BB'D'D of this horn are made movable around the axis A'C' and B'D', a variable aperture horn may be achieved.

Figure 1:
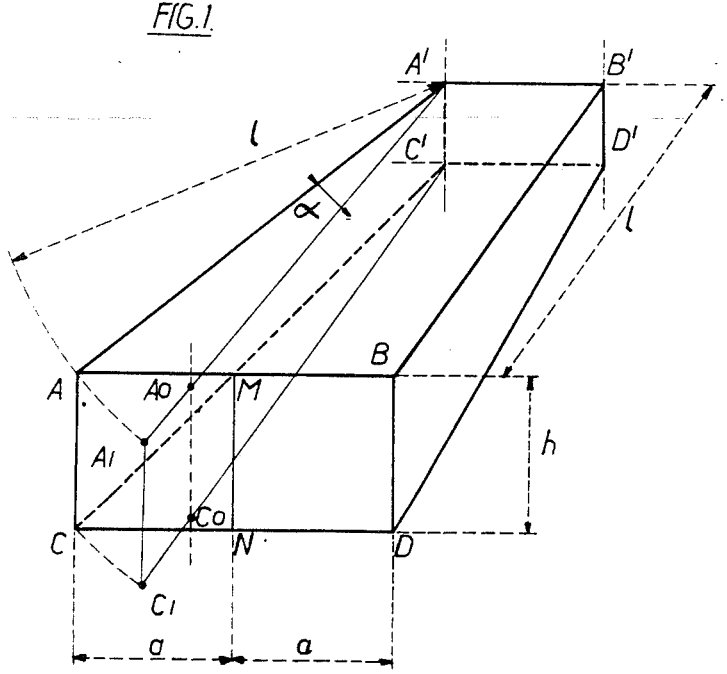
FIGURE 1 represents a classical horn for monopulse aerial.

Nevertheless, it will be noted that when the wall AA'C'C rotates by an angle $\alpha$ such as shown on FIGURE 1, its end AC comes to $A_1C_1$ and is thus outside the plane ABCD of the aperture. $A_1C_1$ is equal to $h$, and therefore the intersection $A_0C_0$ of the plane of this wall with the plane of the aperture presents a length smaller than $h$. It is thus seen that since the upper and lower walls are maintained in position by the wall MN of height $h$, the lateral wall $A_1A'C'C_1$ is not in contact with these fixed walls. The electric contact between the different parts of the horn is perfect only for one single position of the lateral walls and this system cannot therefore be used.

On the contary, in the case of a multimode horn which does not comprise a central wall, the aperture may be made variable while assuring the electric contact between the four walls of the horn.

Figure 2:
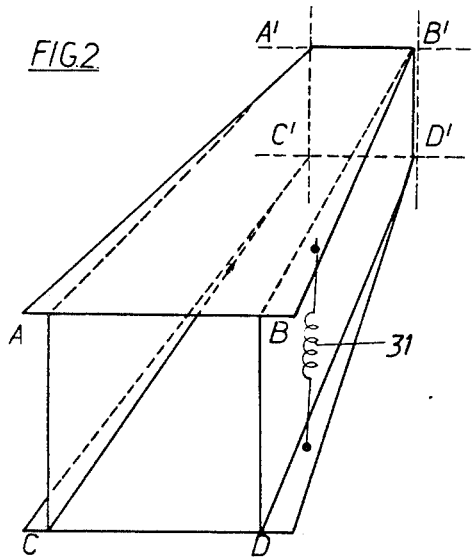
FIGURE 2 represents a multimode horn.

FIGURE 2 represents a perspective view of a multimode horn, the apex of which carries the same references as the homologous apex of the horn of FIGURE 1, If the lateral walls rotate around the axis A'C' and B'D', it is seen that the electric contact is assured permanently if the upper wall ABB'A' and the lower wall CDD'C' rotate around the axis A'B' and C'D' and are pressed, by means of mechanical springs 31, against the edges AA', BB', CC', DD' of the lateral walls.

Figure 3:
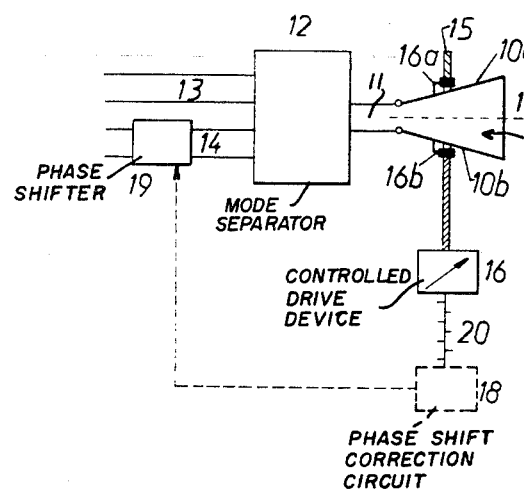
FIGURE 3 represents schematically the multimode source according to the invention.

FIGURE 3 represents schematically the multimode primary source according to the invention. It comprises the horn 10, the moving lateral walls of which have been referenced 10a and 10b (walls AA'C'C and BB'D'D of FIGURE 2), a length guide 11 and a mode separator 12 which carries out the separation between the modes $H_{10}$ and $H_{20}$ in such a way as, at the reception, the sum and difference signals appear separately on the outputs 13 and 14.

The mechanical spacer device for the walls 10a and 10b can be achieved by all the known means, for instance, by driving through the control device 16, a threaded rod 15 comprising a left hand thread on the upper part and a right hand thread on the lower part. Nuts 16a and 16b solidly attached to the walls 10a and 10b are mounted on this rod in such a way as, when the device 16 is actuated, the walls move toward or away from each other symmetrically with respect to the axis 17 of the horn.

It has been seen in the preamble that the half-power angular width of the main lobe of the wave radiated by an aperture varied inversely with respect to the width of this aperture. When the horn is in the narrow open position (width $b_1$, FIGURE 5), the reflector is thus illuminated to the maximum and covers a narrow angular zone, this corresponding to the mode 3. The operation in mode 2 is obtained for the broad aperture (width $b_2$, FIGURE 5).

It is known that in guided propagation, the wavelength $\lambda_g$ of the propagated wave is smaller than the wavelength $\lambda$ in the free space and that the unit shift angle $\beta$ of the wave is $$\beta = \frac{2}{\lambda_g} \qquad (1)$$

One has also $$\lambda_g = \frac{\lambda}{\sin \alpha} \qquad (2)$$

sin $a$ being a function of $\gamma$ and of the width $b$ of the guide or of the horn.

One has in a multimode aerial:

$$\sin \alpha_1 = \sqrt{1 - \left(\frac{\lambda}{2b}\right)^2}$$

in mode $H_{10}$ $$\sin \alpha_2 = \sqrt{1 - \left(\frac{\lambda}{b}\right)^2}$$

in mode $H_{20}$.

It is seen that the two modes of propagation are submitted to different phase shifts in the guide and in the horn.

For each one of the sum and difference channels, the phase shift is equal to the sum of the phase shifts in the guide and in the horn. Since the guide width is constant, the phase shift it introduces is also constant and it is compensated by choosing a suitable value for its length.

On the contrary, the phase shifts of these waves in the horn vary in the primary source according to the invention when the width of the aperture is modified and the difference of phase shift $\Delta\varphi$ between the signals in the mode $H_{10}$ and $H_{20}$ is a function of this parameter.

Figure 4:
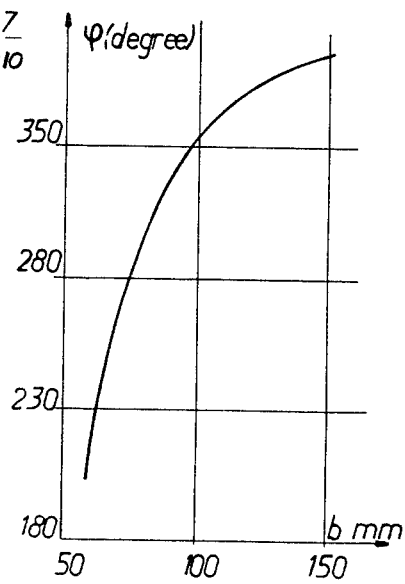
FIGURE 4 represents the curve $\Delta\varphi=f(b)$.
Figure 5:
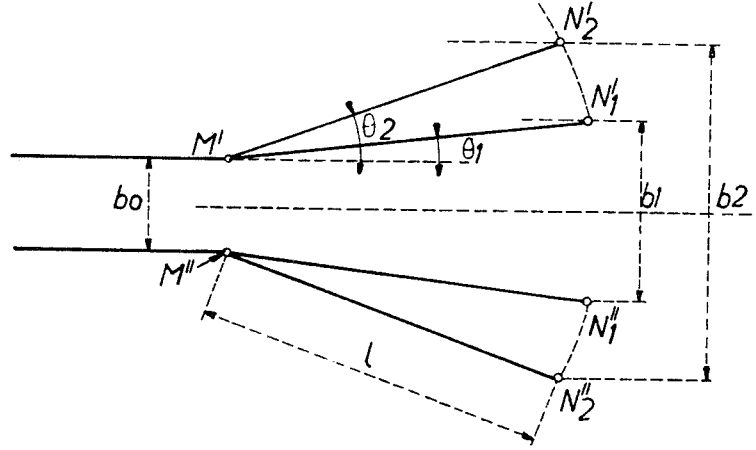
FIGURE 5 represents a section along a plane parallel to the illumination plane of the multimode aerial according to the invention.

FIGURE 4 represents the curve $\Delta\varphi f(b)$ for the horn the characteristics of which are detailed in FIGURE 5.

In an aerial designed for operating with only two values of aperture $b_1$ and $b_2$ (see FIGURE 5), the dimensions of the horn are chosen in such a way as $\Delta\varphi = k\pi$ ($k$ being an integer equal to or higher than 1) and if $k$ is odd, provision is made for a circuit which reverses the polarity of the signal on one of the sum or difference channels when changing of aperture.

When it is required to vary the aperture of the horn in a continuous way between the values $b_1$ and $b_2$ (FIGURE 5), provision is made for a phase shift correction circuit acting in a continuous way over the phase shift in one of the sum or difference channels.

A correction circuit 18 acting on a ferrite phase-shifter 19 mounted on the sum channel 14, has been represented on FIGURE 3, by way of a non-limitative example. The circuit 18 comprises a cam driven by the shaft 20, the section of which is such as a compensation of the variation of the phase shift $\Delta\varphi$ represented on FIGURE 4 is obtained.

In a particular example, for a frequency ranging between 9,400 and 9,600 megacycles, the following values have been chosen (see FIGURE 5):

$$\lambda < b_0 < \frac{3\lambda}{2} \text{ or } b_0 = 45 \text{ mm.}$$

$b_1 = 57$ mm., $b_2 = 148$ mm. and $l = 165$ mm.

The half angle at the apex of the horn is:

$\theta_1 = 2°$ for the narrow aperture
$\theta_2 = 16°$ for the broad aperture

These values have been chosen in such a way as to obtain a phase shift difference $\Delta\varphi$ equal to 180° between the broad aperture and the narrow aperture, as it may be seen on FIGURE 4.

Table I indicates the characteristics of the diagrams of the sum and difference channels obtained for these values, the focalizing system being constituted by a position of paraboloid of revolution.

TABLE I

| Characteristics of the diagrams | Aperture | |
|---|---|---|
|  | Narrow | Broad |
| Width at 3 db of the diagram of the sum channel | 3°10' | 9°15' |
| Spacing of the apex of the diagram of the difference channel | 3°35' | 9°30' |

While the principles of the above invention have been described in connection with specific embodiments and particular modifications thereof, it is to be clearly understood that this description is made by way of example and not as a limitation of the scope of the invention.

What I claim is:

1. A single aperture multimode primary feed system for a monopulse radar antenna which is adapted for variation of the angular zone illuminated, comprising the combination of: a four-sided pyramidal electromagnetic horn for transmitting energy in each of two substantially independent modes, each of said modes corresponding to energy in one of two monopulse antenna patterns; mode separating means for separating energy in each of said modes into corresponding mode transmission lines; waveguide means of rectangular cross-section connected between said horn and said mode separating means for interconnecting energy in both of said modes; means including hinge connections whereby each of the sides of said horn is hinged substantially along its entire joint with a corresponding side of said waveguide; positioning means for adjusting the positions of a first selected opposing pair of sides of said horn substantially symmetrically with respect to the axial centerline of said horn, thereby to vary the effective aperture of said primary feed system in a corresponding plane.

2. The invention set forth in claim 1 further defined in that additional means are included for maintaining a pressure contact between the second opposing pair of sides of said horn and the edges of said first pair of sides for all said adjusted positions of said first pair of sides within the dimensional limits of said second pair.

3. The invention set forth in claim 1 further defined in that phase control means are included in series with one of said mode transmission lines, and control means associated with said positioning means is connected to vary the phase control exerted by said phase control means, whereby correction of relative phase of energy in said one of said mode transmission lines as a function of variation of the positions of said first pair of sides of said horn is effected.

4. The invention set forth in claim 1 further defined in that said mode transmission lines from said mode separating means correspond one to the monopulse sum pattern and the other to the monopulse difference pattern; phase control means are included in series with said sum mode transmission line; and control means responsive to the position of said first pair of horn sides is included and is connected to control the phase change produced by said phase control means, thereby to control the relative phase of energy in said sum and difference mode transmission line as a function of variations of the positions of said first pair of sides of said horn.

5. The invention set forth in claim 2 further defined in that said mode transmission lines from said mode separating means corresponds one to the monopulse sum pattern and the other to the monopulse difference pattern; phase control means are included in series with said sum mode transmission line; and control means responsive to the position of said first pair of horn sides is included and is connected to control the phase change produced by said phase control means, thereby to control the relative phase of energy in said sum and difference mode transmission lines as a function of variation of the positions of said first pair of sides of said horn.

6. The invention set forth in claim 3 further defined in that said mode separation means is adapted to discriminate between and separate the $H_{10}$ and $H_{20}$ modes of waveguide energy, and the wave energy in one of said mode transmission lines corresponds to the $H_{10}$ energy thus isolated and the wave energy in the other of said mode transmission lines corresponds to the $H_{20}$ energy thus separated.

7. In a horn-type single aperture multimode primary feed system for a monopulse radar antenna in which the horn is adjustable to selectively vary the dimensions of the horn aperture between predetermined minimum and maximum limits to vary the angular zone illuminated, the method of transmitting two substantially distinct modes corresponding to energy of two monopulse antenna patterns and controlling the phase relationship between the two distinct modes comprising the steps of:
  (a) feeding signal energy constituting a combination of both modes into the input end of a waveguide coupled to the horn,
  (b) separating the combined signal energy into two distinct modes having predetermined phase relationships with the phase shift produced by the horn,
  (c) channeling the distinct phase-related modes into separate waveguides, and
  (d) adjusting the phase shift of the signal energy in at least one of the separate waveguides in correlation to the difference in phase shift between the two modes caused by variations in phase shifts in the horn resulting from variations in the dimensions of the horn aperture.

8. The method according to claim 7, characterized in that compensation of the difference of phase shift between the signals in the two distinct modes is effected by energizing a ferrite phase-shifter operatively associated with one of the separate waveguides.

9. The method according to claim 7, characterized in that compensation of the difference in phase shift between the signals in the two distinct modes is effected by reversing the polarity of the signals on one of the separate waveguides in conjunction with a change of said aperture dimensions between said minimum and maximum limits.

References Cited

UNITED STATES PATENTS

| | | | |
|---|---|---|---|
| 2,519,603 | 8/1950 | Reber | 343—786 |
| 3,267,475 | 8/1966 | Howard | 343—113 |
| 3,295,136 | 12/1966 | Miller | 343—786 X |

RODNEY D. BENNETT, *Primary Examiner.*

J. P. MORRIS, *Assistant Examiner.*